INVENTOR
JOHN R. WEST

ATTORNEYS

முற்றிலும்...

United States Patent Office 3,142,950
Patented Aug. 4, 1964

3,142,950
POWER MOWER HANDLE AND CONTROL MEMBERS
John R. West, Marysville, Ohio, assignor to The O. M. Scott & Sons Company, Marysville, Ohio, a corporation of Ohio
Original application July 31, 1957, Ser. No. 675,331, now Patent No. 3,028,717, dated Apr. 10, 1962. Divided and this application Dec. 14, 1961, Ser. No. 159,272
4 Claims. (Cl. 56—25.4)

This invention relates to power mowers and more particularly relates to construction of handles and control elements for powered lawn mowers incorporating features to insure proper and safe handling and cutting techniques. This application is a division of co-pending application Serial No. 675,331, filed July 31, 1957, now Patent No. 3,028,717, for Power Mower.

Although the primary purpose of a lawn mower is to cut the grass, other major factors, such as dependable machine functioning under existing operating conditions and safety to the operator, should be considered and provided for in a mower offered to the public. With a dependable machine, which would accomplish the best possible results in lawn cutting with maximum safety to the operator, as the final goal, this invention was conceived and, as specifically disclosed hereinafter, culminated in an electric powered rotary lawn mower with bi-directional handle and control assembly. It is to be understood that the inventive concept of the handle construction and controls can be readily used in reel mowers or in mowers deriving power from sources other than the electric motor herein disclosed.

Prior electric mowers generally have the cord inseparably directly connected to the mower and, as far as is known, have an on-off switch on or adjacent to the handle to control motor operation, and thus present several sources of danger. For example, the switch may be in an "on" position when the line is plugged to an electric source, in which case the blade will rotate unattended and is a source of danger to young children, pets and even older persons who may be unaware that the mower is connected to a source of power. Further, when the prior electric mowers are turned over for cleaning, the switch on the handle may inadvertently be knocked to "on" position possibly resulting in loss of hands or fingers. Many times a mower can "get away" from the operator if he slips or is thrown off balance, and this can occur very easily when cutting on a slope or a bank, resulting in an unattended mower with high speed rotating blades, rolling over the operator, or the mower tilting over and the operator falling into the upended rotating blade.

The primary object of the present invention is to provide a readily disassembled handle and to overcome some of the foregoing disadvantages in powered mowers and to adequately satisfy the criteria of safety which should be present in a power mower. This end has been accomplished through long and expensive research, testing, changes and development of new ideas correlated to mowing requirements.

A further important object of this invention is to provide a novel mower and handle assembly, the resultant cost of which is maintained at a low value, acceptable and competitive to the existing market.

Still another object of this invention is to provide an electric motor powered bi-directional mower with a special assembly for fastening and electrically connecting the power cord to the mower that holds the cord beyond the mower track and can hold the weight of the cord securely as the handle assembly is reversed from one end of the mower to the other end.

A further object resides in providing a novel handle assembly and attachment for a power mower which incorporates readily operable novel handle position locks to maintain the handle in a fixed storage position and which is easily rendered inoperable to enable free reversal of handle position during mower operation.

A still further object resides in providing a novel electric mower handle assembly which incorporates various components and dual controls of safety circuitry for attachment to the mower motor. In this respect a further object resides in novel fabrication of the handle assembly enabling preassembled components to be compactly packaged and shipped for assembly without rewiring except for connection of a plug-in.

Another object resides in providing an electric powered mower with a novel handle having control for a running switch on the handle bar assembly and a safety starting switch provided in a convenient built-in power panel.

A further object resides in the provision of a novel lever and control rod structure for use on a handle bar assembly.

Further novel features and objects of this invention will become apparent from the following detailed description and the appended claims taken in conjunction with the accompanying drawings showing a preferred embodiment thereof, in which:

Briefly, the disclosed embodiment (FIGURE 1) of a power mower 50 has a body frame casting 52 supported on front and rear sets of wheels 54, the wheels in each set being conjointly adjustable to regulate the height at which the mower body is disposed above a lawn surface.

A low speed electric motor is mounted on top of the frame 52 within a housing with the motor shaft on a vertical axis and projecting below the frame. A diametral double rotary bladed cutter (not shown) is fastened to the motor shaft below the frame and, in operative cooperation with specially devised air flow fins creates air swirls and discharge paths from the front and rear of the frame.

Operator safety is provided by frame design and the special motor 72 with its safety control circuit and components, the subject of a co-pending application Serial No. 125,140, filed July 19, 1961. In this control circuit, two switches are used and are required to be simultaneously actuated to start the motor. One is a running switch remaining under the operator's control by handle levers during operation and serves as a "deadman" switch. If for any reason the operator relinquishes control of the running switch, an automatic braking circuit stops the motor within approximately three seconds. In using this mower it is conceived that an electric line storage reel be fastened in the ground adjacent an area to be mowed. Additional reels can be used to extend the mowing area. The electric line from the reels is attached to a strain relief plug extension on the mower handle to permit line to be drawn out as needed when the area is mowed and to effectively cast the line aside upon reversal of the direction of movement of the mower during the mowing operation as hereinafter pointed out. The line can be guided around obstacles such as corners of buildings, flower beds and shrubs by looped pegs placed in the ground, which will primarily serve to prevent the line being whipped across valuable plants.

Figure 1:
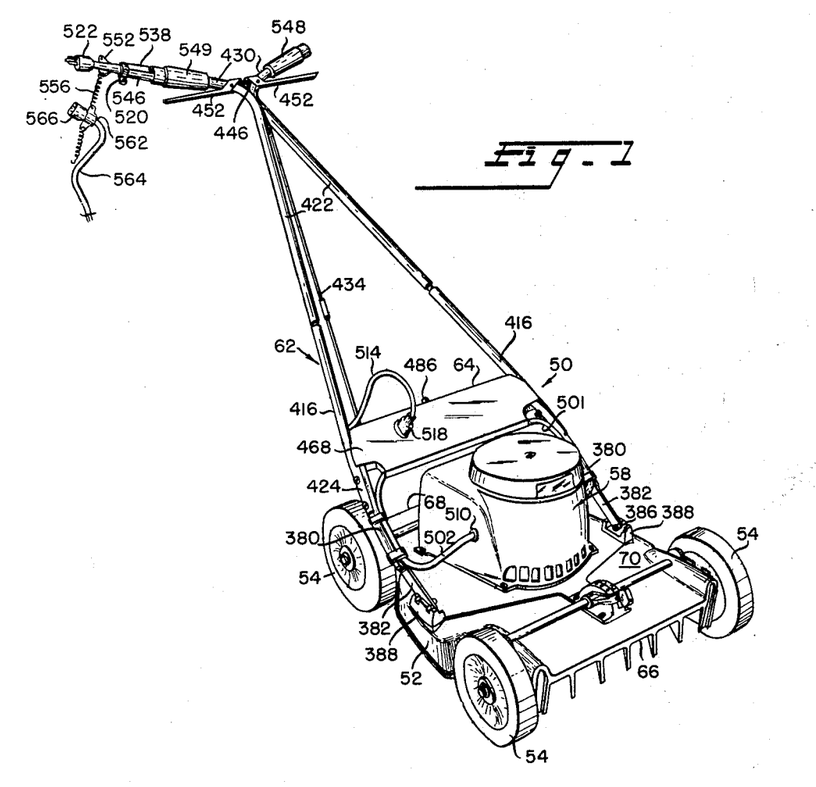
FIGURE 1 is a perspective view of a power mower embodying the handle assembly and control element principles and objects of this invention.

With reference to the drawings for specific details of the exemplary embodiment, the electric powered rotary blade mower 50, seen in FIGURE 1, incorporates the various novel concepts of this invention. The same reference characters are used to designate identical parts throughout the drawings and in the specification.

Figure 2:
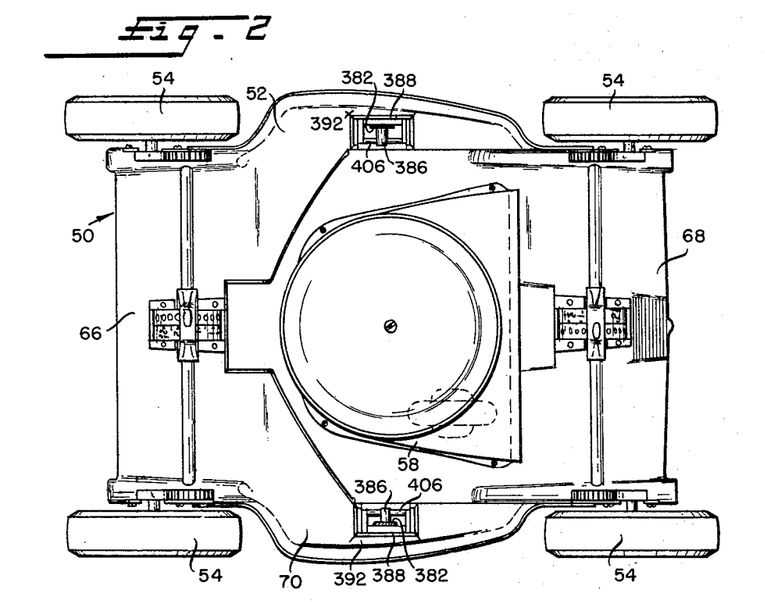
FIGURE 2 is a top plan view of the assembled mower with the handle broken way but showing the handle attachment brackets.
Figure 3:
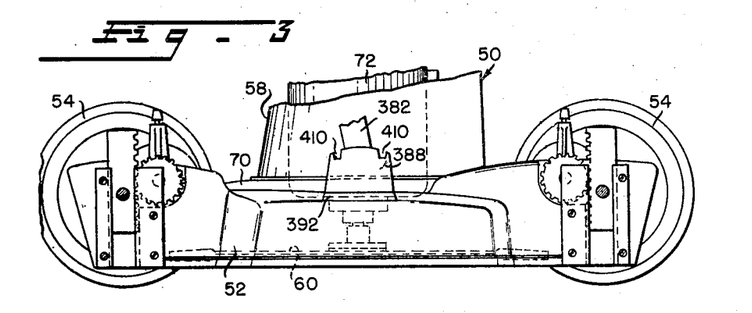
FIGURE 3 is a side elevation view of the mower shown in FIGURE 2 with the near wheels removed to permit illustration of the wheel axle mountings.

Mower 50 includes the housing frame 52 with its four wheels 54, an electric motor power assembly enclosed by the motor housing 58 and carrying the rotary cutter, and a handle assembly 62 which carries a compact enclosed electric component panel assembly 64. Power for motor assembly 56 is supplied through electric components and circuitry which are enclosed in handle assembly 62, the electrical panel 64 and the motor housing 58. Handle assembly 62 is pivotally secured to the housing 52, as will be described, in a manner enabling handle assembly reversal so the mower 50 can be pushed in opposite directions and thus, there is no true front and rear ends of the mower. However, the housing 52 and motor housing 58 are designed to provide distinctive opposite end appearances and for clarity in this description the end 66 shown in FIGURE 1 will be considered the front and the end 68 shown in FIGURE 2 will be considered the rear.

Mower housing 52 is preferably made of cast metal, i.e. steel, aluminum, an alloy or the like and its upper or top wall 70 provides a rigid horizontal platform to carry the motor assembly which in turn carries the rotary cutter.

Handle assembly 62 is fabricated from several separable components and its basic framework consists essentially of tubular stock. The lower handle frame or yoke 376 is a single tubular member bent to provide a cross bar 378 with two side legs 380. Ends 382 of legs 380 are flattened and apertured at 384 to pivotally fit on studs 386 of handle brackets 388.

Figure 8:
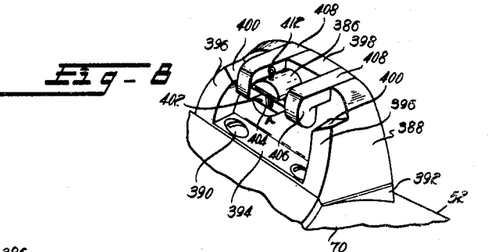
FIGURE 8 is an enlarged perspective view of one of the handle pivot brackets equipped with a position lock.
Figure 9:
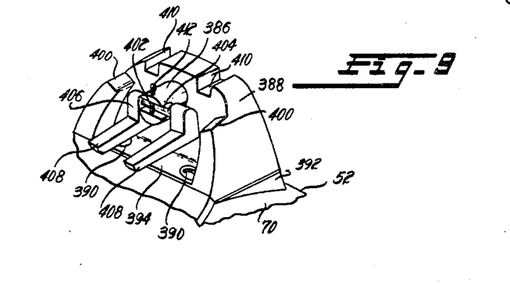
FIGURE 9 is an enlarged perspective view similar to FIGURE 8 with the lock in open position.

A handle bracket 388 (FIGURES 1, 8 and 9) is secured to an associated power housing pad 392 on each side of and midway between the front and rear of mower housing upper wall 70. Brackets 388 are identical and can be made in any desired manner, e.g., cast or fabricated by welding. The illustrated cast brackets 388 have a bottom wall 394, which rests on the pads 392 and through which pass the fastening screws 390, with fore and aft end walls 396 and one vertical side wall 398. Stud 386 is integral with side wall 398 and projects between the end walls 396 and over the bottom wall 394. The flat lower ends 382 of handle side legs 380 when pivotally mounted on studs 386 are disposed between the bracket end walls 396. In this arrangement the edges of flat ends 382 can engage the inclined upper end 400 of bracket end walls 396 to limit the pivotal movement of handle assembly 62 to either front or rear at a convenient operator height when pushing the mower in either direction.

When the mower 50 is stored, less room will be required if the handle can be positioned and held substantially vertically or within a small angle over the center of the mower frame 52. To retain the handle assembly 62 in such position the end stud 386 (FIGURE 9) is provided with a horizontal diametral slot 402. In the slot 402 of at least one of the bracket studs 386, the cylindrical center portion 404 of a latch 406 is pivotally disposed. On each side of the latch cylindrical center portion 404 is an integral dog-leg lug 408. When the handle is moved to an approximately vertical position, latch 406 can be pivotally moved from its unlatched position (FIGURE 9) to a latched position (FIGURE 8) where the dog-leg lugs 408 fit into notches 410 in the upper edge of bracket side wall 398 and serve as limit stops cooperating with the handle leg ends 382 to maintain the handle in the storage position. The latch 406 is retained in stud slot 402 by a cotter pin 412 through the end of stud 386.

The upper part of handle assembly 62 consists of two lower tubular members 416 with reduced diameter ends 418 telescoped into ends 420 of two upper tubular members 422. Lower ends 424 of the lower tubular members 416 are pressed together and curved to match the tubular contour of side legs 380 of the lower frame 376, and are secured to the side legs 380 by bolts and nuts 426. From the position of attachment to the lower frame 376, the two sets of lower and upper tubular members 416 and 422 converge to a position adjacent the upper extremity at which position the two upper members 422 are welded to a small cylindrical sleeve 428 which is aligned longitudinally of the handle assembly 62. Immediately above the welded sleeve 428, the ends 430 of upper tubular members 422 are bent in a divergent manner to provide handle bars.

The two upper members 422 being welded together become a rigid assembly and when the lower members 416 are telescoped into ends 420, and fastened thereto as by screws, and lower member ends 424 secured to the lower handle frame or yoke 376, a rugged, rigid handle assembly frame results.

*Handle bar control.*—Many prior devices which incorporate handle bar control utilize some type of control lever easily manipulated at the handle bar but such prior art devices have some complex linkage, wire or cable control. The following construction provides a positive handle bar lever control which is far superior to ordinary flexible wire or cable controls which can jam or twist and which are used on most power mowers for clutch, brake, throttle and other controls.

Figures 4, 5, 6:
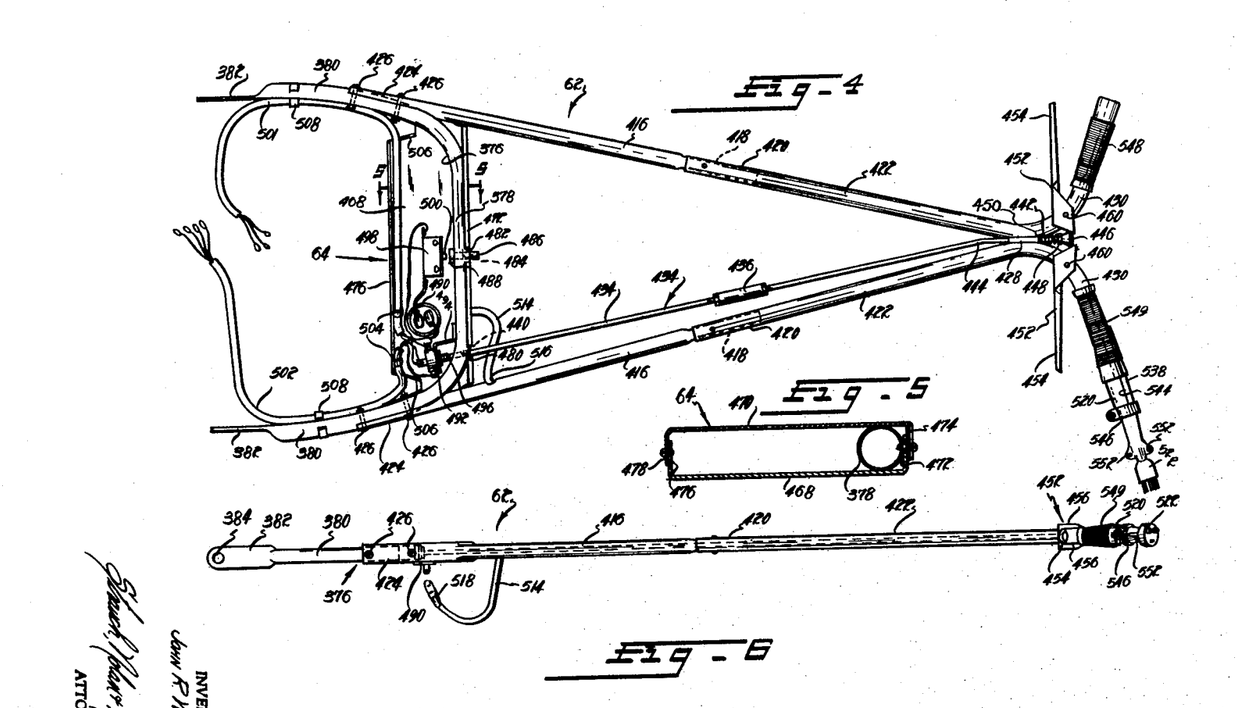
FIGURE 4 is a plan view of an assembled mower handle with a panel shroud removed to show electric control components and wiring disposition below the handle mid-bracket.
FIGURE 5 is an enlarged detail section through the handle control panel taken on line 5—5 of FIGURE 4.
FIGURE 6 is a side view of the handle shown in FIGURE 4.
Figure 7:
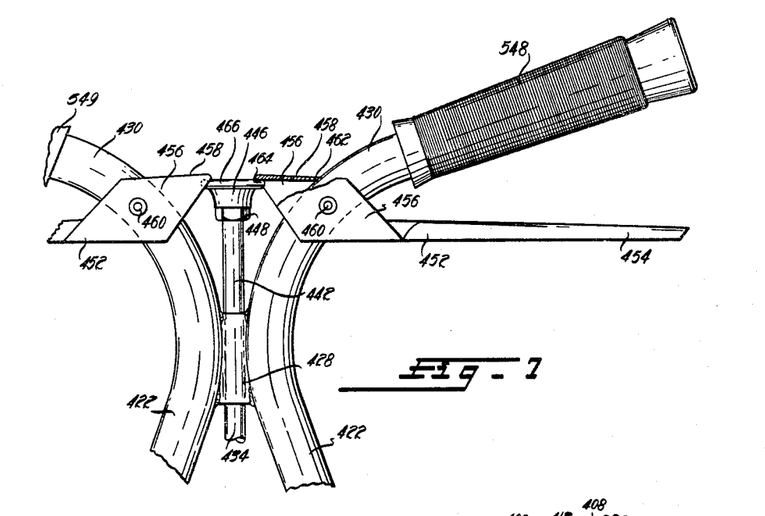
FIGURE 7 is an enlarged detail view of the handle bars with one of the handle bar control levers broken away to show construction.

The handle bar lever control includes an adjustable rod 434 with a center turnbuckle 436, lower end 438 of rod 434 projecting through apertures 440 in the lower frame cross bar 378 and the upper end 442 passing in slidable relation through the previously described short sleeve 428 which is secured between upper tubular members 422. In the illustrated electric mower 50, rod 434 is used to operate a spring loaded running switch 492, described in appropriate circuitry in previously identified application Serial No. 125,140. For apparent reasons, rod 434 is disposed to one side of the handle assembly center line, however the rod 434 can be formed to extend in other directions from adjacent the sleeve 428 by changing the bend 444. Rod upper end 442 is slidably guided by sleeve 428 so it will be disposed on the handle frame center line and is threaded to receive a flat head knob 446 and locking nut 448 above the sleeve 428. As will be described, the spring loaded switch 492 biases rod 434 to an upper position, and the switch is actuated against the spring bias by pushing on knob 446. If the control requires any auxiliary spring bias, a compression spiral spring 450 can be placed on the rod 434 between the upper end of sleeve 428 and the knob lock nut 448 as illustrated in FIGURE 4. Inasmuch as the specific spring 450 may or may not be used, it has not been shown in FIGURE 7.

Similar dual control levers 452 (FIGURE 7) are provided on each handle bar 430, either or both of which can be used to push the control rod 434 against spring bias by pulling the lever handle 454 toward the handle bar 430. Although levers 452 can be made of metal, it will be preferable considering safety factors on an electric mower to make them of non-conducting material such as plastic. Each lever 452 is an integral part, preferably molded including the handle 454 which terminates near the ends and between the lower edges of two side plates 456 which are spaced apart a sufficient distance to enable a close free passage of the tubular handle member 422 between the lever plates. A cross plate 458 joins the top edges and extends to the inner corners of side plates 456. Each lever 452 is assembled over its respective handle bar 430 to the position illustrated and pivotally secured to the upper tubular member 422 by a pin 460 which projects through both side plates 456 and the tubular member 422. So assembled, the weight of lever handles 452 will cause levers 452 to hang by gravity in an inoperative position which is generally horizontal and determined by contact of an edge 462 of the cross plate 458 against the tubular member 422. The other edge 464 of the cross plate 458 extends over the flat edge portion 466 of the actuating rod knob 446. The rod length can be adjusted by turnbuckle 436 so the spring biased position of knob 446 is slightly below lever cross plates 458 when levers 452 are hanging free. When lever handles 454 are pulled up toward the handle bars 430 the cross plate 458 is moved down to engage knob 446 and push the rod 434 down against spring bias to actuate the switch.

*Electrical panel.*—Three electrical circuit components are carried in a panel 64 situated on the lower handle frame 376 (see FIGURE 4). Panel 64 is an enclosure made of two similarly shaped shrouds 468 and 470 (see FIGURE 5) each having a top flange respectively 472, 474, and a bottom flange respectively 476, 478. One shroud 470 is omitted from FIGURE 4 to illustrate the mounted interior components. Shrouds 468 and 470 are placed over the lower frame cross bar (see FIGURE 5) 378 and secured to cross bar 378 with the top flanges 472 and 474 overlapped and secured to cross bar 378 by screws. Holes or notches 480 adjacent one end of flanges 472 and 474 will be disposed above the aforedescribed apertures 440 in the cross bar 378 and permit passage of the control rod 434. A second set of holes or notches 482 are centrally located in flanges 472 and 474 and will align over apertures 484 in the center of cross bar 478. A dielectric plunger 486, with a head 488 disposed on the lower side of cross bar 478, projects up through the apertures 484 and holes 482 and serves as a starting switch actuator. The lower shroud flanges 476 and 478 also overlap and are fastened together by screws, while the edges of the shrouds overlay and engage the frame legs 380.

A pronged electrical connector 490 is mounted on shroud 468 with the connecting prongs projecting exterior of the panel 64. Enclosed within the panel 64 is a double pole, double throw, spring biased, plunger actuated running switch 492. Switch 492 is secured to a bracket 494 welded to the underside of cross bar 478 and is positioned so its spring biased plunger 496 is engaged by and aligned with the lower end 438 of control rod 434. It is the spring biased position of switch 492 that holds the aforedescribed control rod 434 and knob 446 in the upper position under control levers 452.

Also mounted on the interior side of shroud 468 is a starting switch 498 with its spring biased plunger 500 disposed immediately below and aligned with the dielectric plunger 486. Starting switch 498 is a single pole "on-off" switch, spring biased to an "off" position. Depression of dielectric plunger 486 from exterior of panel 64 will place the switch in an "on" position.

The lines and circuits which interconnect the connector 490, switches 492 and 498 and the motor assembly are fully described in the foresaid co-pending application Serial No. 125,140, sufficient at this time is the fact that electric lines from inside the panel 64 are grouped into two cables 501 and 502. Each of cables 501 and 502 are secured to the inside of shroud 468 by clamps 504, and pass out of the lower corners of panel 464 below shroud support tabs 506. The cables 501 and 502 pass down the inside of the associated lower frame legs 380 being held thereto by clip fasteners 508 and then pass through side holes 510 in the motor housing 58. The ends of leads in each cables 501 and 502 are appropriately connected to the motor, transformer, rectifier or other motor assembly components.

A two wire electric cable 514 (FIGURES 4, 6, 10 and 11) passes through one of the handle bars 430, through upper tubular member 422, into lower tubular member 416, out through an inside hole 516 in the lower member just above the panel 64 and terminates in a female connector plug 518 which connects over the pronged connector 490 in the panel 64. A sufficient length of cable 514 is exposed between the lower tubular handle member 416 and the plug 518 to enable disconnection of the telescoped ends 418 and 420 of the associated tubular members 416 and 420 for disassembled shipping. Although it is presently desired for production reasons that cable 514 be spliced just below the telescoped connections 418 and 420 during initial assembly, the cable 514 could be run completely through the telescoped handle and a removable plug secured on the end in place of molded plug 518.

*A handle bar plug connector and strain relief* is provided at one of the handle bars 430. Clearly shown in FIGURES 4, 6 and 10, the upper length of two wire cable 514 terminates in a heavy molded rubber strain relief extension member 520 which has a three pin plug connector 522. The heavy molded construction of the extension cooperates between the cable 514 and the end of tubular handle bar 430 to eliminate bending of the cable at right angles and to thereby prevent breaking of the wire inside of the cable which occurs upon large angle constant flexing. Extension 520 also eliminates the possibility of the end of handle bar 430 wearing through cable 514 and shorting the power circuit. Strain relief extension 520 is of sufficient length to place plug connector 522 to one side of handle bars 430 extending beyond the track of the mower for a purpose to be explained.

The two wires of cable 514 connect to pins 524 and 525 of plug 522 and a third pig tail lead 526 is connected to the ground pin 528 of plug 522. Pig tail lead 526 is spiralled several times around the cable 514 and connected to a helical wire spring 530, preferably made of hard drawn oil tempered wire, before the strain relief 520 is molded around the cable 514 and to the plug 522. This wrapping of grounding wire 526 around power line 514 enables the strain relief member 520 to be flexed in any direction without placing any appreciable strain on ground wire 526 which could tear it loose from the grounding spring 530 or from ground terminal pin 528.

Figures 10, 11:
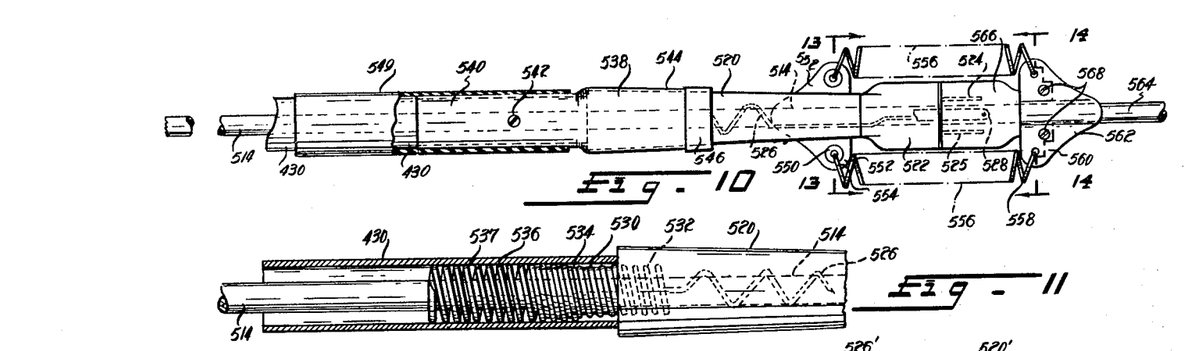
FIGURE 10 is an enlarged view of the handle bar which includes the combined strain relief and spring-loaded plug-in electrical connection and shows the metal support spline connection between the extension and a handle bar.
FIGURE 11 is a partially broken-away enlarged detail view of the connection between the strain relief extension and the handle bar and also illustrates the grounding wire disposition.

As shown in FIGURE 11, the spring 530 has one end 532 molded inside the heavy portion of strain relief and the remainder partially molded in a reduced diameter plug portion 534 of the strain relief. A second helical spring 536, preferably made in a manner similar to that of spring 530, wound to a slightly larger diameter than spring 530 and normally slightly in excess of the inside diameter of tubular handle bar 430, is threaded on the first spring 530 with approximately eight coils 537 extending beyond the plug end 534 of strain relief extension member 520. This construction provides means to hold the strain relief extension member 520 securely in the end of handle bar 430 yet rotation of the strain relief 520 in one direction, when the spring 536 and plug end 534 are inserted in handle bar 430, will tend to reduce the diameter of the spring 536 enabling ease of insertion. Once the strain relief 520 is inserted the spring 536 will tend to expand and tightly grip the inside of the handle bar 430. Furthermore any attempt to rotate the strain relief member out of the handle bar 430 will cause expansion from one or the other end of spring 536 to prevent removal.

To prevent occurrence of abrupt bends in the strain relief member 520 where it enters handle bar 430 a metal splint 538 (FIGURES 4 and 10) has one end 540 contoured to fit over and is fastened to handle bar 430 by a screw 542. The other end 544 of splint 538 is contoured to fit over the upper portion of approximately one-half of the strain relief member 520 and is secured at its end by a circular clamp 546.

A continuous grounding circuit is provided from the mower housing 52 through the handle assembly 62, through springs 536, 530 and ground lead 526 to the ground pin 528 in strain relief plug 522.

Figures 12, 13, 14:
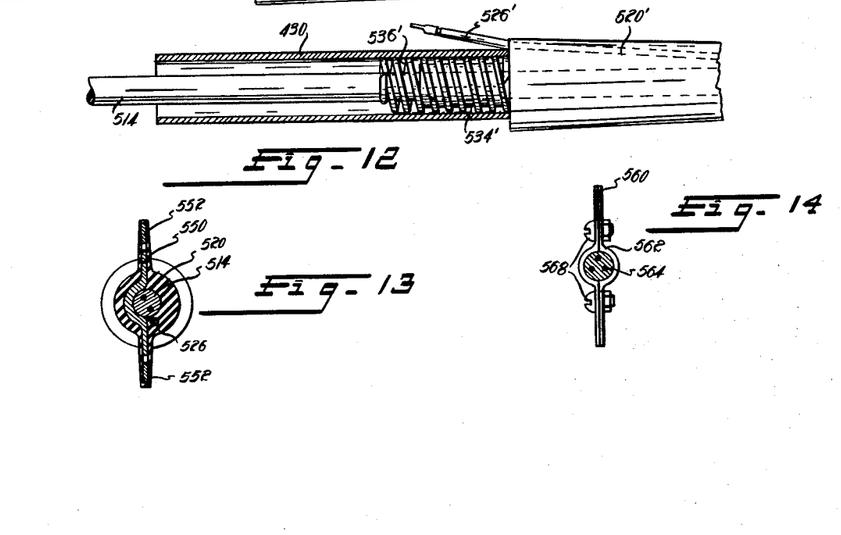
FIGURE 12 is an enlarged detail view illustrating a modified grounding connection.
FIGURE 13 is an enlarged section view taken on line 13—13 of FIGURE 10 and illustrates the resilient electrical connection spring anchor which is molded in the strain relief extension.
FIGURE 14 is an enlarged section view taken on line 14—14 of FIGURE 10 illustrating the spring anchor elements clamped on the power supply line.

A modified grounding of pig tail lead 526' is shown in FIGURE 27 where the end of lead 526' is to be soldered or fastened in some appropriate manner to the handle bar 430 after the strain relief member 520' is inserted. In this embodiment a single retaining coil spring 536' is used and provides a tight direct clamp between strain relief extension plug end 534' and the handle bar 430.

Suitable handle grips 548 and 549 are placed over the ends of handle bars 520, grip 549 covering the end portion 540 of splint 538.

Some previously known electric mowers have a short lead-in length of electric cable with a plug end while others have longer extensions of cable. With either arrangement a long extension cord is normally used and the weight of the extension cord pulling through the grass will cause it to disconnect at the plug connection to the lead-in cable to the mower. To eliminate this it has become a frequent practice to tie the plug ends of the lead-in and extension together. This practice is undesirable because it eliminates the safety of a quick disconnect and presents a hazard from the standpoint of wearing through the wiring and causing a short.

The above undesirable problem and its unsatisfactory solution have been eliminated by a resilient spring loaded disconnect. Molded into the strain relief member 520, adjacent the plug 522, is a bracket plate 550 (FIGURES 10 and 13) which overlies the cable 514 and has two apertured side wing lugs 552. The rubber of the molder strain relief preferably covers the entire bracket 550. Bracket lugs 552 serve to anchor hooked ends 554 of two tension springs 556 which have their opposite ends 558 looped and fastened in apertured wing lugs 560 of a double plate bracket 562 (FIGURE 14) which is fastened around the extension cable 564 behind a three wire female plug connector 566 by screws 568.

When extension cable plug 566 is connected to the handle bar strain relief extension plug 522, the hooked ends 558 of spring 556 are anchored in wing lugs 552 to provide a spring loaded power line connection. Springs 556 are designed to pull the full weight of an extension cable of a convenient length, say 150 feet and will also withstand slight jerks on the cable. However, in case the mower is run to the extreme limit of the cable extension or in case of emergency the tension spring will give and permit a quick disconnection of power to the mower.

Figure 16:
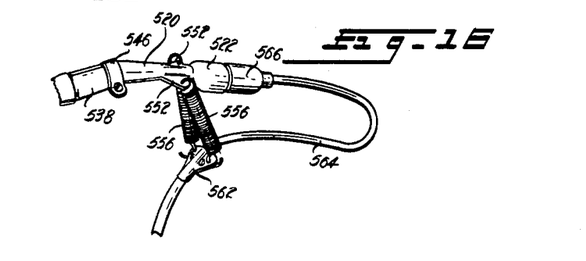
FIGURE 16 is a modified spring bracket extension cord hook-up arrangement.

The modified cord spring bracket hook-up (FIGURE 16) is proposed for heavy duty pulling of long lengths of power cord. The cord bracket 562 is clamped around the cord at eight to twelve inches from the end plug 566. This permits a resilient connection for dragging the cord but prevents disconnection of plug 566 during heavy loads.

Figure 15:
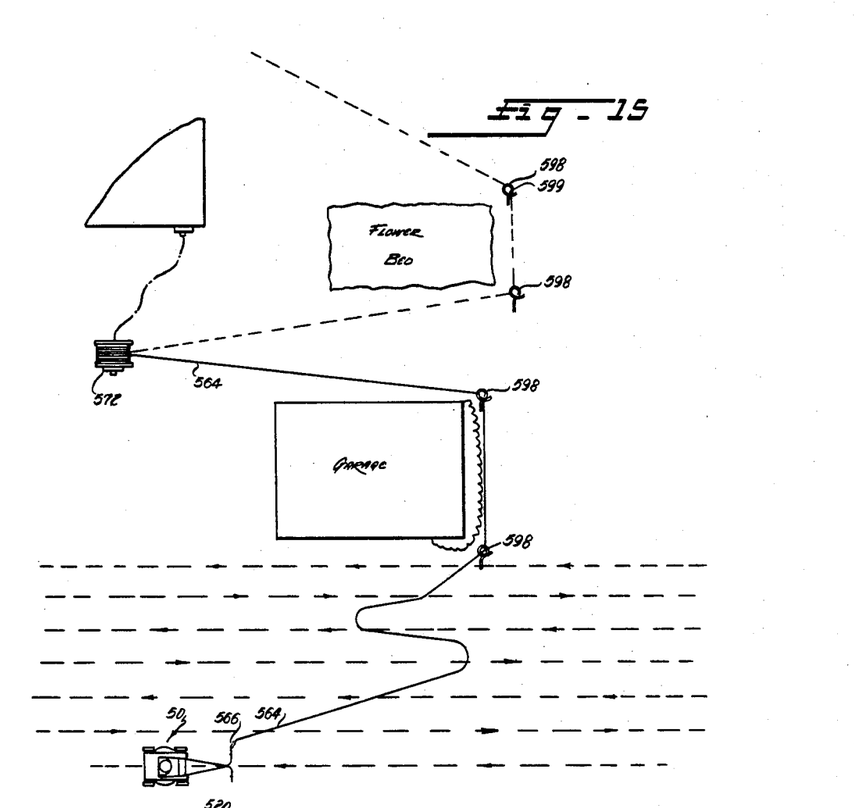
FIGURE 15 is a diagrammatic view illustrating a method of using the electric lawn mower permitted by a bi-directional handle assembly.

Shown in FIGURE 15, by keeping the strain relief extension 520 on the side of the mower closest to the electric cord which can be wound on a reel 572, the cord 564 will always be laid down in a path several inches to the side of the mower on grass area which has been mowed, and each time the mower handle assembly 62 is reversed, to start the next mowing sweep, the strain relief extension 520 will pick up the cord 564 and due to its resilient nature will give an outward flip on cord 564 which throws the cord slightly in a direction away from the mower track. The positioning of plug 522 by strain relief extension 520 to the side of mower 50 beyond its cutting track and the flip action imparted to cord 564 by reversal of handle assembly 562 are material aids in preventing inadvertent cutting of the power cord by the mower.

FIGURE 15 also illustrates the use of looped pegs 598 which can be driven into the ground adjacent flower beds, shrubbery and buildings to prevent dragging of the power cord across valuable plants and around rough obstacles. Pegs 598 are made of long, heavy wire rod material with approximately a one and one-third looped end 599 spread to enable quick insertion of the cord 564 but enabling a free play of the cord in either direction from and through the loop without permitting the cord to free itself.

For starting safety, the mower can be started only when a handle control is held and a starting button depressed. The starting button is placed a sufficient distance from the handle control so it can be depressed with the operator's toe and a person cannot inadvertently start the mower while any of his extremities are under the housing.

Many of the features of this invention are applicable to gasoline powered mowers as well as to electric powered mowers. For instance, the construction of control levers and rod on the handle assembly would be applicable to clutch operated devices on a gasoline powered mower.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A powered lawn mower comprising: a wheeled frame; handle attachment brackets on said frame; a cutting mechanism and a power means, drive connected thereto, secured to said frame; a handle assembly comprising a lower yoke with legs secured to said brackets and laterally disposed dual handle bars at the upper end; control lever means pivoted on said handle assembly at each said handle bar, each lever means comprising at least one long lever arm disposed along an associated handle bar in a position to be gripped and moved toward said handle bar and a short lever arm on the opposite side of said long lever arm; an elongate rod guided in said handle assembly for movement essentially longitudinally of said handle assembly having means at its upper end adapted to be engaged and shifted by each said short lever arm when an associated said long lever arm is gripped against said handle bar; control means adapted to be engaged by the lower end of said rod and connected to control said power means; and biasing means between said rod and said handle assembly to bias said rod so its upper end is urged toward said short lever arms.

2. An electric powered mower comprising: a wheeled frame with handle attachment brackets; cutting mechanism; an electric motor on said frame drive connected to said cutting mechanism; and a handle assembly comprising a lower portion including a yoke means with legs for attachment to said handle brackets, an electric panel with motor control components and circuitry including a starting switch, a running switch and power input and output circuitry to and from said switches and to said motor, and an upper portion including handle bars with duel independently operable handle lever grip controls, one grip control disposed on each handle bar, linkage adapted to be operated by either grip control and passing into said panel to actuate said running switch, and power inlet wiring inside the structure of said handle assembly leading from the end of one handle bar to said power input circuitry; said handle assembly having upper and lower portions releasably joined adjacent said electrical panel, and a power line input circuitry plug-in connector assembly provided between said upper portion and said electrical panel.

3. An electric powered mower comprising: a wheeled frame with handle attachment brackets; cutting mechanism; an electric motor on said frame drive connected to said cutting mechanism; and a handle assembly comprising handle bars, a lower yoke means with legs pivotally attached to said handle attachment brackets, an electrical circuit panel with motor control components and circuitry including starting and running switches and power input and output circuitry to and from said switches and to said motor, said power input circuitry includes power inlet wiring inside the structure of said handle assembly leading from the end of one handle bar to said electrical panel, said handle bars have a spread substantially equal to the width of said mower frame, and a short flexible power cable extension connected to said inlet wiring is secured on said one bar with connecting means at its extremity for a power line connection.

4. A handle assembly for a lawn mower comprising: a lower yoke with arms adapted to be pivotally secured to a lawn mower and laterally disposed dual handle bars at the upper end; control lever means pivoted on said handle assembly at each said handle bar, each lever means comprising at least one long lever arm disposed along an associated handle bar in a position to be gripped and moved toward said handle bar and a short lever arm on the opposite side of said long lever arm; a rod guided in said handle assembly for movement essentially longitudinally of said handle assembly having means at its upper end adapted to be engaged and shifted by each said short lever arm when an associated said long lever arm is gripped against said handle bar; control means including a portion adapted to be engaged in control relationship by the lower end of said rod; means enabling said control means to be connected to control a lawn mower power means; and biasing means between said rod and said handle assembly to bias said rod so its upper end is urged toward said short lever arms.

References Cited in the file of this patent
UNITED STATES PATENTS

| | | |
|---|---|---|
| 656,140 | Kennedy | Aug. 14, 1900 |
| 1,001,125 | Danielson | Aug. 22, 1911 |
| 1,042,193 | Bowling | Oct. 22, 1912 |
| 2,265,443 | McGuire | Dec. 9, 1941 |
| 2,370,907 | Lewis | Mar. 6, 1945 |
| 2,487,093 | Bright | Nov. 8, 1949 |
| 2,511,160 | Grobowski | June 13, 1950 |
| 2,791,437 | Knarzer | May 7, 1957 |
| 2,796,714 | Denney | June 25, 1957 |
| 2,842,788 | Rench et al. | July 15, 1958 |
| 2,926,478 | Jepson | Mar. 1, 1960 |